(12) United States Patent
Guizilini et al.

(10) Patent No.: US 12,380,582 B2
(45) Date of Patent: Aug. 5, 2025

(54) WARPING DEPTH FEATURES FOR DEPTH ESTIMATION

(71) Applicant: Toyota Research Institute, Inc., Los Altos, CA (US)

(72) Inventors: Vitor Guizilini, Santa Clara, CA (US); Rares A. Ambrus, San Francisco, CA (US); Sergey Zakharov, San Francisco, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 461 days.

(21) Appl. No.: 17/827,019

(22) Filed: May 27, 2022

(65) Prior Publication Data
US 2023/0386059 A1 Nov. 30, 2023

(51) Int. Cl.
*G06T 7/579* (2017.01)
*G06N 20/00* (2019.01)
*G06T 3/18* (2024.01)

(52) U.S. Cl.
CPC ............ *G06T 7/579* (2017.01); *G06N 20/00* (2019.01); *G06T 3/18* (2024.01); *G06T 2207/20081* (2013.01); *G06T 2207/30252* (2013.01)

(58) Field of Classification Search
CPC . G06T 7/579; G06T 3/18; G06T 2207/20081; G06T 2207/30252; G06T 2207/20084; G06T 7/50; G06N 20/00; G06N 3/0895; G06N 3/0464; G06N 3/045
See application file for complete search history.

(56) References Cited

U.S. PATENT DOCUMENTS

| | | | |
|---|---|---|---|
| 9,224,205 B2 * | 12/2015 | Tsin | G06T 7/181 |
| 9,565,450 B2 | 2/2017 | Jung et al. | |
| 10,122,986 B2 | 11/2018 | Hattori et al. | |
| 10,706,582 B2 * | 7/2020 | Chandraker | G06V 20/588 |
| 11,062,502 B2 * | 7/2021 | Saragih | G06T 9/001 |

(Continued)

FOREIGN PATENT DOCUMENTS

| | | |
|---|---|---|
| KR | 20170025214 A | 3/2017 |
| KR | 102110690 B1 | 5/2020 |
| KR | 20200143276 A | 12/2020 |

OTHER PUBLICATIONS

Mwiti, D., "Research guide for depth estimation with deep learning", Retrieved from (https://heartbeat.comet.ml/research-guide-for-depth-estimation-with-deep-learning-1a02a439b834), Sep. 25, 2019, pp. 1-29.

*Primary Examiner* — Tom Y Lu
(74) *Attorney, Agent, or Firm* — Christopher G. Darrow; Darrow Mustafa PC

(57) ABSTRACT

System, methods, and other embodiments described herein relate to an improved approach to training a depth model for monocular depth estimation by warping depth features prior to decoding. In one embodiment, a method includes encoding, using an encoder of a depth model, a source image into depth features of a scene depicted by the source image. The method includes warping the depth features into warped features of a target frame of a target image associated with the source image. The method includes decoding, using a decoder of the depth model, the warped features into a depth map. The method includes training the depth model according to a loss derived from the depth map.

20 Claims, 6 Drawing Sheets

(56) References Cited

U.S. PATENT DOCUMENTS

| | | | |
|---|---|---|---|
| 11,176,709 B2* | 11/2021 | Pillai | G01B 11/22 |
| 11,354,847 B2* | 6/2022 | Li | G06T 7/70 |
| 12,094,159 B1* | 9/2024 | Akbas | G06V 40/10 |
| 2019/0356905 A1* | 11/2019 | Godard | G06T 7/73 |
| 2021/0133920 A1 | 5/2021 | Lee et al. | |
| 2021/0150279 A1* | 5/2021 | Dudzik | G01S 17/931 |
| 2021/0397855 A1* | 12/2021 | Guizilini | G06T 7/50 |
| 2021/0398301 A1* | 12/2021 | Guizilini | G06T 7/70 |

* cited by examiner

WARPING DEPTH FEATURES FOR DEPTH ESTIMATION

TECHNICAL FIELD

The subject matter described herein relates, in general, to systems and methods for determining the depths of a scene from a monocular image and, more particularly, to training a depth model to derive the depths by warping depth features and decoding the depth features into depth maps that are then analyzed for training.

BACKGROUND

Various devices that operate autonomously or that provide information about a surrounding environment use sensors that facilitate perceiving obstacles and additional aspects of the surrounding environment. For example, a robotic device may use information from the sensors to develop an awareness of the surrounding environment in order to navigate through the environment. In particular, the robotic device uses the perceived information to determine a 3-D structure of the environment in order to identify navigable regions and avoid potential hazards.

The ability to perceive distances through estimation of depth using sensor data provides the robotic device with the ability to plan movements through the environment and generally improve situational awareness about the environment. However, depending on the available onboard sensors, the robotic device may acquire a limited perspective of the environment and, thus, encounter difficulties in distinguishing aspects of the environment.

For example, while monocular cameras can be a cost-effective approach to acquiring information about the surroundings, the sensor data from such cameras does not explicitly include depth information. Instead, processing routines derive depth information from the monocular images. However, leveraging monocular images to perceive depth can suffer from various difficulties. Self-supervised depth estimation may be performed by training a depth network to minimize photometric loss. Achieving this generally involves estimating a single depth value per pixel of an image in conjunction with a global transformation between cameras and warping information from one image so that it is re-projected onto another image. However, warping the depth estimates can cause various aberrations within the resulting image. That is, warping can cause a loss of border areas, duplication of features, and so on when performed with depth values output after decoding from a depth model. Thus, while self-supervised training of depth models can be a valuable approach, various difficulties still exist that can impact overall accuracy.

SUMMARY

In one embodiment, example systems and methods relate to an improved approach to training a depth model to derive depth estimates by warping depth features. As noted previously, training a depth model may involve warping depth values output from a depth model into a frame of reference of a target image in order to derive a direct comparison for training. However, warping the depth values may involve creating aberrations in the resulting warped depth map that include missing edges, duplicated features, and so on. As a result, the aberrations can cause noise in a training signal derived from the warped depth map. Accordingly, in at least one approach, a depth system is disclosed that implements a novel approach to training by warping depth features prior to decoding, thereby improving a resulting depth map and avoiding aberrations associated with warping the depth map directly.

For example, in one approach, the depth system proceeds with a self-supervised training process by acquiring a pair of images that includes a source image and a target image. The depth system uses a pose model to determine a transformation between the images and a depth model to initially encode the source image into image features. The image features are encoded representations of objects, surfaces, etc., depicted within the source image. Accordingly, the depth system applies the transformation derived by the pose model to the depth features to warp the depth features into a space of the target image. Once warped, the depth system further applies a decoder of the depth model to generate a depth map from the warped depth features. Consequently, the resulting depth map is warped to the space of the target image without directly warping the depth values. Accordingly, the depth system can then proceed with using the warped depth map to derive a loss signal in relation to the target image and train the depth model. In this way, the depth system improves the training of the depth model by avoiding aberrations from directly warping depth values.

In one embodiment, a depth system is disclosed. The depth system includes one or more processors and a memory communicably coupled to the one or more processors. The memory stores instructions that, when executed by the one or more processors, cause the one or more processors to encode, using an encoder of a depth model, a source image into depth features of a scene depicted by the source image. The instructions include instructions to warp the depth features into warped features of a target frame of a target image associated with the source image. The instructions include instructions to decode, using a decoder of the depth model, the warped features into a depth map. The instructions include instructions to train the depth model according to a loss derived from the depth map.

In one embodiment, a non-transitory computer-readable medium including instructions that, when executed by one or more processors, cause the one or more processors to perform various functions is disclosed. The instructions include instructions to encode, using an encoder of a depth model, a source image into depth features of a scene depicted by the source image. The instructions include instructions to warp the depth features into warped features of a target frame of a target image associated with the source image. The instructions include instructions to decode, using a decoder of the depth model, the warped features into a depth map. The instructions include instructions to train the depth model according to a loss derived from the depth map.

In one embodiment, a method is disclosed. In one embodiment, the method includes encoding, using an encoder of a depth model, a source image into depth features of a scene depicted by the source image. The method includes warping the depth features into warped features of a target frame of a target image associated with the source image. The method includes decoding, using a decoder of the depth model, the warped features into a depth map. The method includes training the depth model according to a loss derived from the depth map.

BRIEF DESCRIPTION OF THE DRAWINGS

The accompanying drawings, which are incorporated in and constitute a part of the specification, illustrate various systems, methods, and other embodiments of the disclosure.

It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments are disclosed associated with an improved approach to training a depth model to derive depth estimates by warping depth features. As noted previously, training a depth model may involve warping depth values output from a depth model into a frame of reference of a target image in order to derive a direct comparison for training, such as with a synthesized image generated from the warped values. However, warping the depth values may cause aberrations in the resulting warped depth map that include missing edges, duplicated features, and so on. As a result, the aberrations can cause noise in a training signal derived from the warped depth map. Accordingly, in at least one approach, a depth system is disclosed that warps depth features prior to decoding, thereby improving a resulting depth map and avoiding aberrations associated with warping the depth map directly.

For example, in one approach, the depth system proceeds with a self-supervised training process by acquiring a pair of images that includes a source image and a target image. The depth system uses a pose model to determine a transformation between the images and a depth model to initially encode the source image into image features. The image features are encoded representations of objects, surfaces, etc. depicted within the source image. Accordingly, the depth system applies the transformation derived by the pose model to the depth features to warp the depth features into a space of the target image. Once warped, the depth system further applies a decoder of the depth model to generate a depth map from the warped depth features. Consequently, the resulting depth map is warped to the space of the target image without directly warping the depth values. Accordingly, the depth system can then proceed with using the warped depth map to derive a loss signal in relation to the target image and train the depth model. Deriving the loss signal may include synthesizing an image from the warped depth map and using the synthesized image in comparison to the target image to calculate an appearance-based loss. In this way, the depth system improves the training of the depth model by avoiding aberrations from directly warping depth values.

Figure 1:
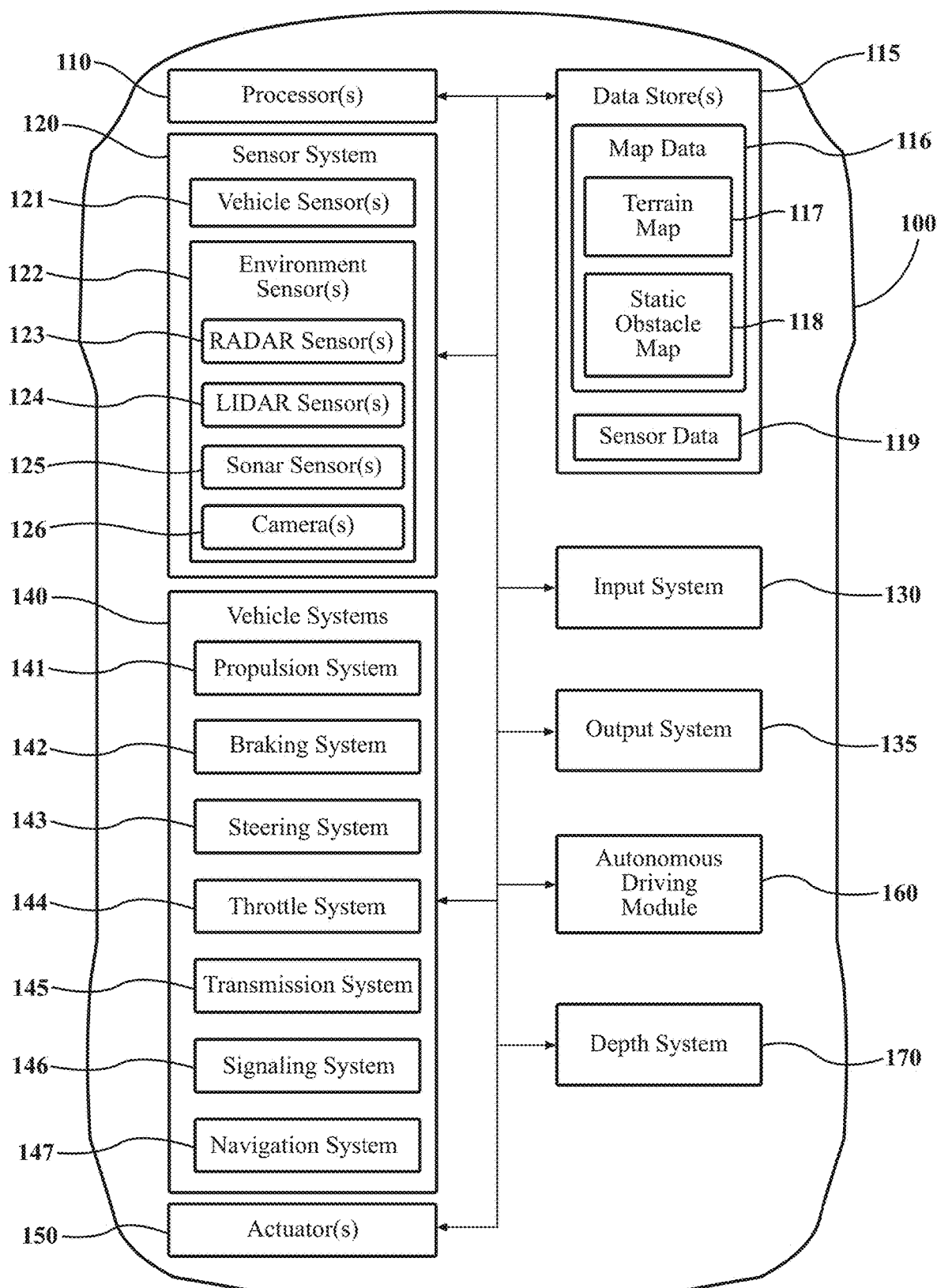
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any electronic device (e.g., smartphone, surveillance camera, robot, etc.) that, for example, perceives an environment according to monocular images, and thus benefits from the functionality discussed herein. In yet further embodiments, the vehicle 100 may instead be a statically mounted device, an embedded device, or another device that uses monocular images to derive depth information about a scene or that separately trains the depth model for deployment in such a device.

In any case, the vehicle 100 (or another electronic device) also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), distributed computing service, etc.).

Some of the possible elements of the vehicle 100 are shown in FIG. 1 and will be described along with subsequent figures. However, a description of many of the elements in FIG. 1 will be provided after the discussion of FIGS. 2-6 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a depth system 170 that functions to train and implement a model to process monocular images and provide depth estimates for an environment (e.g., objects, surfaces, etc.) depicted therein. Moreover, while depicted as a standalone component, in one or more embodiments, the depth system 170 is integrated with the automated driving module 160, the camera 126, or another component of the vehicle 100. The noted functions and methods will become more apparent with a further discussion of the figures.

Figure 2:
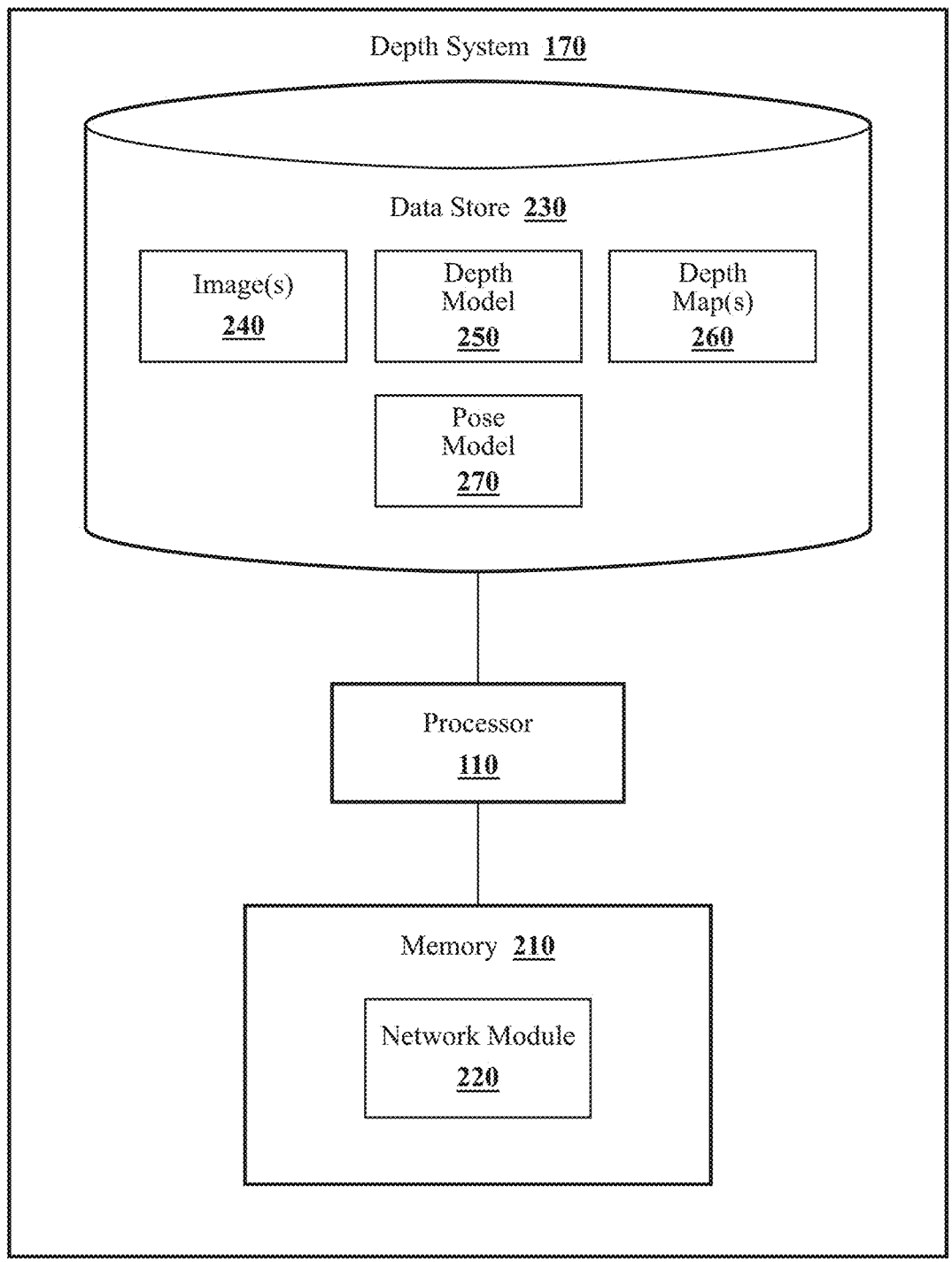
FIG. 2 illustrates one embodiment of a depth system that is associated with training a depth model.

With reference to FIG. 2, one embodiment of the depth system 170 is further illustrated. The depth system 170 is shown as including a processor 110. Accordingly, the processor 110 may be a part of the depth system 170 or the depth system 170 may access the processor 110 through a data bus or another communication path. In one or more embodiments, the processor 110 is an application-specific integrated circuit (ASIC) that is configured to implement functions associated with a network module 220. In general, the processor 110 is an electronic processor such as a microprocessor that is capable of performing various functions as described herein. In one embodiment, the depth system 170 includes a memory 210 that stores the network module 220. The memory 210 is a random-access memory (RAM), read-only memory (ROM), a hard disk drive, a flash memory, or other suitable memory for storing the network module 220. The network module 220 is, for example, computer-readable instructions that, when executed by the processor 110, cause the processor 110 to perform the various functions disclosed herein.

Furthermore, in one embodiment, the depth system 170 includes a data store 230. The data store 230 is, in one embodiment, an electronic data structure, such as a database, that is stored in the memory 210 or another memory, and that is configured with routines that can be executed by the processor 110 for analyzing stored data, providing stored data, organizing stored data, and so on. Thus, in one embodiment, the data store 230 stores data used by the network module 220 in executing various functions. In one embodiment, the data store 230 includes images 240, a depth model 250, depth map(s) 260, and a pose model 270 along with, for example, other information that is used by the network module 220.

Training data used by the depth system 170 generally includes one or more monocular videos that are comprised of a plurality of frames in the form of the images 240 that are monocular images. Of course, the images 240 may alternatively be input images for using during inference by the depth model 250. As described herein, a monocular image is, for example, an image from the camera 126 that may be part of a video, and that encompasses a field-of-view (FOV) about the vehicle 100 of at least a portion of the surrounding environment. That is, the monocular image is, in one approach, generally limited to a subregion of the surrounding environment. As such, the image may be of a forward-facing (i.e., the direction of travel) 60, 90, 120-degree FOV, a rear/side facing FOV, or some other subregion as defined by the characteristics of the camera 126.

In any case, the monocular image itself includes visual data of the FOV that is encoded according to a video standard (e.g., codec) associated with the camera 126. In general, the characteristics of the camera 126 and a video standard define a format of the monocular image. Thus, while the particular characteristics can vary according to different implementations, in general, the image has a defined resolution (i.e., height and width in pixels) and format. Thus, for example, the monocular image is generally an RGB visible light image. Whichever format that the depth system 170 implements, the images 240 are monocular images in that there is no explicit additional modality indicating depth nor an explicit corresponding image from another camera from which the depth can be derived (i.e., no stereo camera pair). In contrast to a stereo image that may integrate left and right images from separate cameras mounted to generate an overlapping FOV to provide an additional depth channel, the monocular image does not include explicit depth information, such as disparity maps derived from comparing the stereo images pixel-by-pixel. Instead, the monocular image implicitly provides depth information in the relationships of perspective and size of elements depicted therein from which the depth model 250 derives the depth maps 260.

Moreover, the monocular video may include observations of many different scenes. That is, as the camera 126 or another original source camera of the video progresses through an environment, perspectives of objects and features in the environment change, and the depicted objects/features themselves also change, thereby depicting separate scenes (i.e., particular combinations of objects/features). Thus, the depth system 170 may extract particular training sets (e.g., pairs of source and target images) of monocular images from the monocular video for training. In particular, the depth system 170 generates the sets of images from the video so that the sets of images are of the same scene are related through depiction of the same scene. As should be appreciated, the video includes a series of monocular images that are taken in succession according to a configuration of the camera. Thus, the camera may generate the images 240 (also referred to herein as frames) of the video at regular intervals, such as every 0.033 s. That is, a shutter of the camera operates at a particular rate (i.e., frames-per-second (fps) configuration), which may be, for example, 24 fps, 30 fps, 60 fps, etc.

For purposes of the present discussion, the fps is presumed to be 30 fps. However, it should be appreciated that the fps may vary according to a particular configuration. Moreover, the depth system 170 need not generate the images for training from successive ones (i.e., adjacent) of the frames from the video, but instead can generally include separate images of the same scene that are not successive as training images. Thus, in one approach, the depth system 170 selects every other image depending on the fps. In a further approach, the depth system selects every fifth image as a training pair. The greater the timing difference in the video between the images, the more pronounced a difference in camera position; however, this may also result in fewer shared features/objects between the images. As such, as previously noted, the pairs of training images are of a same scene and are generally constrained, in one or more embodiments, to be within a defined number of frames (e.g., 5 or fewer) to ensure correspondence of an observed scene between the monocular training images. In any case, the pairs of training images generally have the attributes of being monocular images from a monocular video that are separated by some interval of time (e.g., 0.06 s) such that a perspective of the camera changes between the pair of training images as a result of the motion of the camera through the environment while generating the video.

Moreover, while the images 240 are described as training images (i.e., for purposes of adapting the depth model 250 to improve accuracy/understanding), the depth system 170 similarly processes images of the same/similar character after training to generate the noted outputs (i.e., the depth maps 260). Thus, during inference and while in use as implemented, the images 240 are instead derived from a monocular camera and may not be associated via a video. Additionally, while the depth model 250 generates a single depth map per image, the pose model 270 accepts inputs of multiple images (e.g., two or more) to produce outputs. Additionally, it should be noted that while the training data is generally characterized as including the images 240 alone, in various implementations, the depth system 170 may also use supplemental training data, such as sparse depth information (e.g., sparse LiDAR scans).

With further reference to FIG. 2, the depth system 170 further includes the depth model 250, which produces the depth maps 260, and the pose model 270, which produces transformations of camera pose between the images 240 (i.e., between a source image and a target image). The depth model 250 and the pose model 270 are, in one embodiment, machine learning algorithms. However, the particular form of either model is generally distinct. That is, for example, the depth model 250 is a machine learning algorithm that accepts an electronic input in the form of a single monocular image and produces a depth map 260 as a result of processing the monocular image. The exact form of the depth model

250 may vary according to the implementation but is generally a convolutional encoder-decoder type of neural network.

Figure 3:
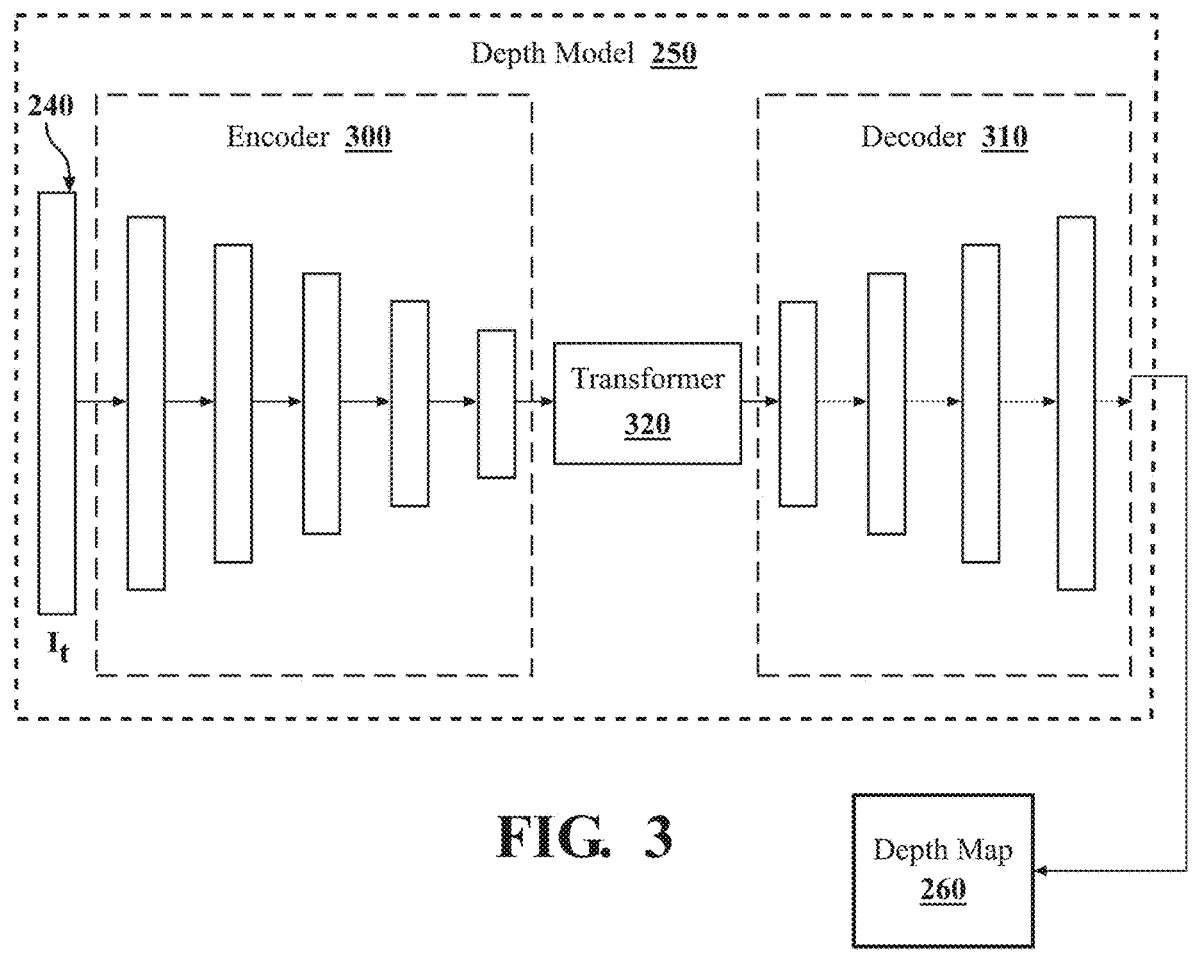
FIG. 3 illustrates one embodiment of a depth model that infers depth from a monocular image.
Figure 4:
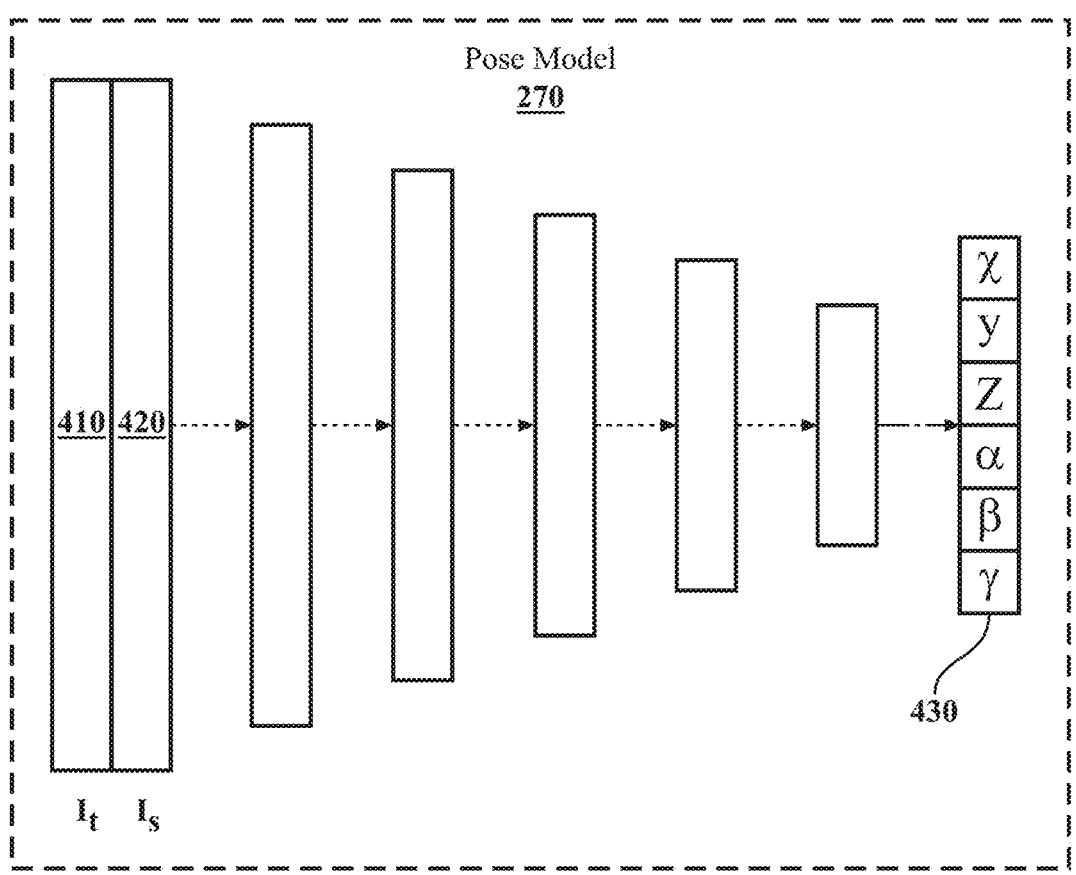
FIG. 4 illustrates one embodiment of a pose model that predicts rigid transformations of a pose between images.

As an additional explanation of one embodiment of the depth model 250 and the pose model 270, consider FIGS. 3-4. FIG. 3 illustrates a detailed view of the depth model 250, while FIG. 4 illustrates the pose model 270. In one embodiment, the depth model 250 has an encoder/decoder architecture. The encoder/decoder architecture generally includes a set of neural network layers, including convolutional components embodied as an encoder 300 (e.g., 2D and/or 3D convolutional layers forming an encoder) that flow into deconvolutional components embodied as a decoder 310 (e.g., 2D and/or 3D deconvolutional layers forming a decoder). In one approach, the encoder 300 accepts one of the images 240 at a time as an electronic input and processes the image to extract features therefrom. The features are, in general, aspects of the image that are indicative of spatial information that the image intrinsically encodes. As such, encoding layers that form the encoder function to, for example, fold (i.e., adapt dimensions of the feature map to retain the features) encoded features into separate channels, iteratively reducing spatial dimensions of the image 240 while packing additional channels with information about embedded states of the features. Thus, the addition of the extra channels avoids the lossy nature of the encoding process and facilitates the preservation of more information (e.g., feature details) about the original monocular image.

Accordingly, in one embodiment, the encoder 300 is comprised of multiple encoding layers formed from a combination of two-dimensional (2D) convolutional layers, packing blocks, and residual blocks. Moreover, the separate encoding layers generate outputs in the form of encoded feature maps (also referred to as tensors), which the encoding layers provide to subsequent layers in the depth model 250. As such, the encoder 300 includes a variety of separate layers that operate on the monocular image, and subsequently on derived/intermediate feature maps that convert the visual information of the monocular image into embedded state information in the form of encoded features of different channels.

In one embodiment, the decoder 310 unfolds (i.e., adapts dimensions of the tensor to extract the features) the previously encoded spatial information in order to derive the depth map 260 for a given image according to learned correlations associated with the encoded features. That is, the decoding layers generally function to up-sample, through sub-pixel convolutions and/or other mechanisms, the previously encoded features into the depth map 260, which may be provided at different resolutions. In one embodiment, the decoding layers comprise unpacking blocks, two-dimensional convolutional layers, and inverse depth layers that function as output layers for different scales of the feature map. The depth map 260 is, in one embodiment, a data structure corresponding to the input image that indicates distances/depths to objects/features represented therein. Additionally, in one embodiment, the depth map 260 is a tensor with separate data values indicating depths for corresponding locations in the image on a per-pixel basis.

Moreover, the depth model 250 can further include skip connections for providing residual information between the encoder 300 and the decoder 310 to facilitate memory of higher-level features between the separate components. While a particular encoder/decoder architecture is discussed, as previously noted, the depth model 250, in various approaches, may take different forms and generally functions to process the monocular images and provide depth maps that are per-pixel estimates about distances of objects/features depicted in the images.

Continuing to FIG. 4, the pose model 270 accepts two monocular images (i.e., a source image and a target image) of the same scene as an electronic input and processes the monocular images ($I_t$, $I_s$) 410/420 of the images 240 to produce estimates of camera ego-motion in the form of a set of 6 degree-of-freedom (DOF) transformations 430 between the two images. The pose model 270 itself is, for example, a convolutional neural network (CNN) or another learning model that is differentiable and performs a dimensional reduction of the input images to produce the transformation 430. In one arrangement, the pose model 270 includes 7 stride-2 convolutions, a 1×1 convolution with 6*(N−1) output channels corresponding to 3 Euler angles and a 3-D translation for one of the images (source image $I_s$), and global average pooling to aggregate predictions at all spatial locations. The transformation 430 is, in one embodiment, a 6 DOF rigid-body transformation belonging to the special Euclidean group SE(3) that represents the change in pose between the pair of images provided as inputs to the depth model 250. In any case, the pose model 270 performs a dimensional reduction of the monocular images to derive the transformation 430 therefrom.

With reference back to FIG. 3, the depth model 250 includes a transformer 320. The transformer 320 functions to warp depth features from the encoder 300. That is, for example, the transformer 320 applies the transformation 430 from the pose model 270 to the encoded depth features generated when the encoder 300 processing a source image. As a result, the transformer 320 outputs warped features that are translated into a space of the target image. In general, the space of the target image is a perspective of the camera 126 when capturing the target image according to an FOV of the camera 126 at that time. Accordingly, the decoder 310 can then decode the warped features into the depth map 260, which is also warped to the target image by way of simply processing the warped features. In this way, the depth model 250 generates the depth map 260 with the warping process integrated as an intermediate function of processing the source image. Of course, in order for this process to execute, the pose model 270 initially processes the source image and the target image to generate the transformation 430 that is applied by the transformer 320.

As an additional note, while the depth model 250, and the pose model 270 are shown as discrete units separate from the network module 220, the depth model 250 and the pose model 270 are, in one or more arrangements, generally integrated with the network module 220. That is, the network module 220 functions to execute various processes of the models 250/270 and use various data structures of the models 250/270 in support of such execution. Accordingly, in one embodiment, the network module 220 includes instructions that function to control the processor 110 to generate the depth map 260 using the depth model 250, and generate the transformation 430 using the pose model 270.

Figure 5:
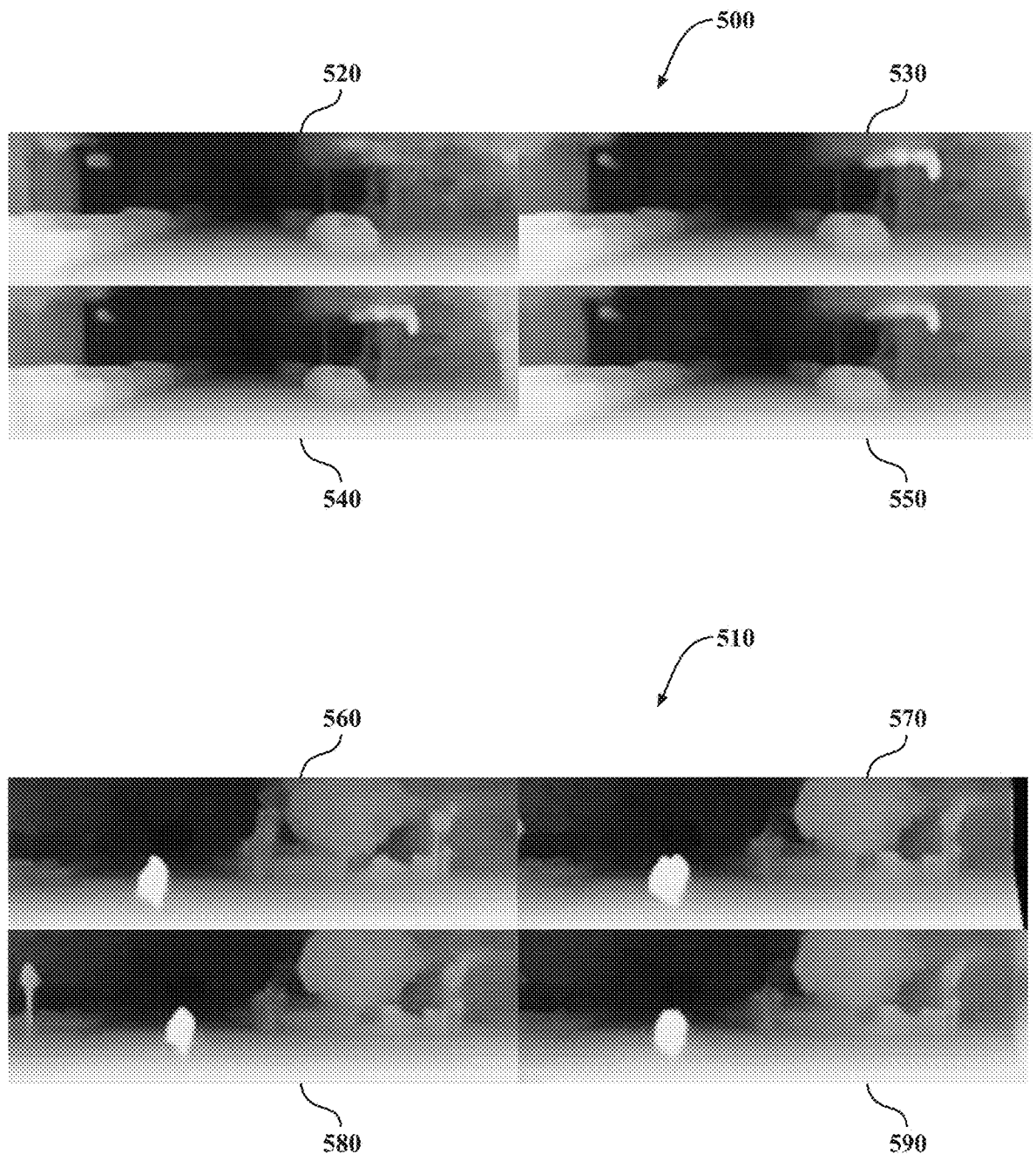
FIG. 5 illustrates examples of depth maps.

With reference to FIG. 5, two separate examples 500 and 510 of depth maps are shown. In example 500, depth map 520 corresponds to a target image, while depth map 540 corresponds to a source image. Additionally, depth map 530 is a warped depth map that was warped by adapting the depth values directly, whereas depth map 550 was warped according to the present approach of warping the depth features as an intermediate process in the depth model 250. Accordingly, as shown in the map 530 versus the map 550, the map 530 includes duplication of some aspects of objects that is not present in the map 550. Additionally, example 510 further illustrates the improvements of using the depth feature warping versus depth value warping. As shown, the depth map 560 corresponds to a target image, while depth map 580 corresponds to a source image. The depth map 570 results from depth value warping of the depth map 580 while the depth map 590 results from depth feature warping. Accordingly, the depth map 570 exhibits multiple aberrations including duplication of the foreground object (i.e., addition of pixels at a close range) and clipping of the right border. These aberrations generally result in reduced accuracy in training of the depth model 250. Accordingly, the process of warping the depth features as opposed to warping the depth values themselves improves the training process.

As a further explanation of the training architecture formed in relation to the depth model 250 and the pose model 270, further consider FIG. 2. The network module 220 generally includes instructions that function to control the processor 110 to execute various actions associated with the models 250/270. For example, in one embodiment, the network module 220 functions to execute the pose model 270 to produce the transformation 430, which functions as a basis for warping the depth features. Accordingly, the network module 220 controls the depth model 250 to initially encode the source image into depth features and then the network module 220 warps the depth features into a frame of the target image using the transformation 430. Thereafter, the network module 220 decodes the warped features into the depth map 260 that is warped to the frame of the target image. From the depth map 260 the network module 220 generates the photometric loss as will be explained further subsequently.

In any case, the network module 220 synthesizes the depth values into an inferred form of the target image. As further explanation, consider the self-supervised loss context for structure from motion (SfM), which involves the network module 220 being generally configured with a goal of (i) a monocular depth model $f_D$: I→D (e.g., depth model 250), that predicts the scale-ambiguous depth $\hat{D}=f_D(I(p))$ for every pixel p in the target image $I_t$; and (ii) a monocular ego-motion estimator $f_x$: ($I_t$, $I_s$) (e.g., pose model 270), that predicts the set of 6-DoF rigid-body transformations for all s∈S given by $$x_{t \to s} = \begin{pmatrix} R & t \\ 0 & 1 \end{pmatrix} \in SE, \quad (3)$$

between the target image $I_t$ and the set of source images $I_s \in I_s$ considered as part of the temporal context. As a point of implementation, in one or more embodiments, the network module 220 uses various frames $I_{t-1}$ and $I_{t+1}$ as source images, although a larger context can be implemented in various arrangements (e.g., ±5 images). It should be appreciated that the source images relate to the target image ($I_t$) by depicting the same scene and via the transformations.

The network module 220, in at least one arrangement, implements the training objective for the depth model 250 according to various components. The components include a self-supervised term (e.g., photometric loss) that operates on appearance matching $\mathcal{L}_p$ between the target image $I_t$ and a synthesized image $I_{s \to t}$ (also annotated as $\hat{I}_t$) from the context set $S=\{I_s\}_{s=1}^S$, which may further include masking $M_p$ and depth smoothness $\mathcal{L}_{smooth}$ although a sampling process may avoid the use of masking and smoothness in at least one approach.

$$\mathcal{L}(I_t, \hat{I}_t) = \mathcal{L}_p \odot \mathcal{M}_p + \lambda_1 \mathcal{L}_{smooth} \quad (1)$$

$M_p$ is a binary mask that can be implemented to avoid computing the photometric loss on the pixels that do not have a valid mapping (e.g., pixels from the separate images that do not project onto the target image given the estimated depth). However, when using the present approach of warping depth features, $M_p$ may not be implemented. $\lambda_1$, $\lambda_2$ represent weights for adjusting the loss terms in eq (1). $\mathcal{L}_p$ represents appearance matching loss and is implemented according to, in one embodiment, a pixel-level similarity between the target image $I_t$ and the synthesized image $\hat{I}_t$ using a structural similarity (SSIM) term combined with an L1 pixel-wise loss term inducing an overall photometric loss as shown in equation (2).

$$\mathcal{L}_p(I_t, \hat{I}_t) = \alpha \frac{1 - SSIM(I_t, \hat{I}_t)}{2} + (1-\alpha)\|I_t, \hat{I}_t\| \quad (2)$$

While multi-view projective geometry provides strong cues for self-supervision, errors due to parallax and out-of-bounds objects have an undesirable effect incurred on the photometric loss that can include added noise to the training. Accordingly, in one or more approaches, the network module 220 can mitigate these effects by calculating the minimum photometric loss per pixel for the source image according to (3).

$$\mathcal{L}_p(I_t, S) = \min_{s \in S} \mathcal{L}_p(I_t, I_{s \to t}) \quad (3)$$

The intuition involves the same pixel not occluding or being out-of-bounds in all context images, and that the association with minimal photometric loss should be the correct association. The mask ($M_p$) removes pixels that have appearance loss that does not change between frames and that may be associated with various anomalies, which includes static scenes and dynamic objects moving at a similar speed as the camera.

$$M_p = \left( \min_{s \in S} \mathcal{L}_p(I_t, I_s) > \min_{s \in S} \mathcal{L}_p(I_t, I_{s \to t}) \right) \quad (4)$$

$\mathcal{L}_s$ represents depth smoothness loss and is implemented to regularize the depth in textureless low-image gradient regions, as shown in equation (5). The smoothness loss is an edge-aware term that is weighted for separate pyramid levels starting from 1 and decaying by a factor of two for the separate scales.

$$\mathcal{L}_s(\hat{D}_t) = |\delta_x \hat{D}_t| e^{-|\delta_x I_t|} + |\delta_y \hat{D}_t| e^{-\delta_y I_t|} \quad (5)$$

Thus, the network module 220, in one approach, calculates the appearance-based loss according to the above to include the photometric loss, the mask, and the depth smoothness terms for the self-supervised training. However, as mentioned previously, in one or more arrangements, the appearance-based loss may solely include the photometric loss without the additional terms. Moreover, in yet further approaches, the loss calculation may not be appearance-based but may instead rely on direct comparisons of depth maps. In any case, through this training, the depth model 250 develops a learned prior of the monocular images as embodied by the internal parameters of the model 250 from the training on the images. In general, the model 250 develops the learned understanding about how depth relates to various aspects of an image according to, for example, size, perspective, and so on.

It should be appreciated that the network module 220, in one or more configurations, trains the depth model 250 and the pose model 270 together in an iterative manner over the training data embodied by the images 240 that includes a plurality of monocular images from video. Through the process of training the model 250, the network module 220 adjusts various hyper-parameters in the depth model 250 to fine-tune the functional blocks included therein. Through this training process, the depth model 250 develops a learned prior of the monocular images as embodied by the internal parameters. In general, the depth model 250 develops the learned understanding about how depth relates to various aspects of an image according to, for example, size, perspective, and so on. Consequently, the network module 220 can provide the resulting trained depth model 250 in the depth system 170 to estimate depths from monocular images that do not include an explicit modality identifying the depths. In further aspects, the network module 220 may provide the depth model 250 to other systems that are remote from the depth system 170 once trained to perform similar tasks. In this way, the depth system 170 functions to improve the accuracy of the depth model 250.

Figure 6:
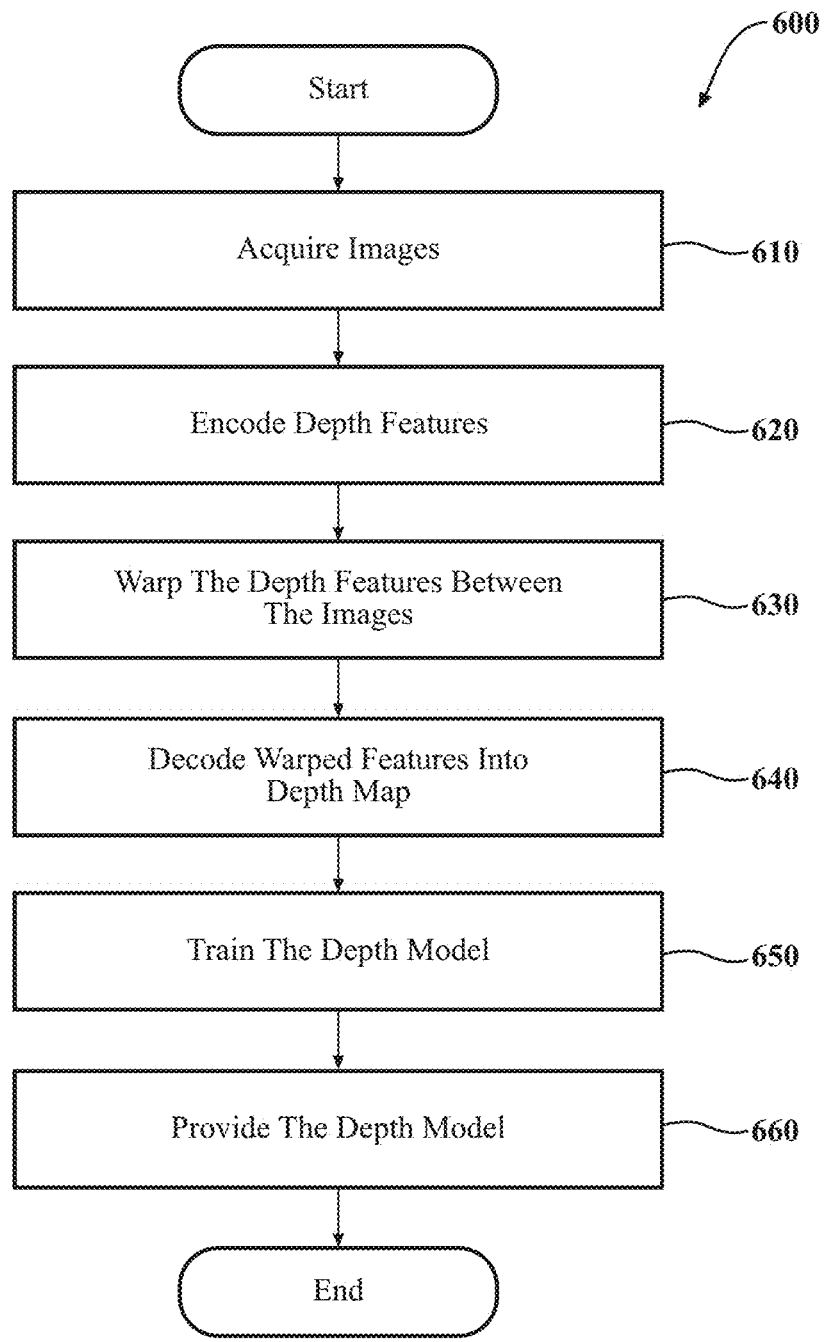
FIG. 6 is a flowchart illustrating one embodiment of a method for training a depth model.

FIG. 6 illustrates a flowchart of a method 600 that is associated with training a depth model by warping depth features. Method 600 will be discussed from the perspective of the depth system 170. While method 600 is discussed in combination with the depth system 170, it should be appreciated that the method 600 is not limited to being implemented within the depth system 170 but is instead one example of a system that may implement the method 600.

At 610, the network module 220 acquires the images 240. As previously outlined, the images 240 are derived from a monocular video for training and are grouped into sets such that a set of images are captured within a defined time of one another in order to depict a common scene. This is generally distinct from inference where the images 240 do not have an explicit relationship. In any case, as noted, the images 240 are monocular images having characteristics defined according to a camera and associated systems that capture the images 240. For separate iterations of the training process, the depth system 170, in one approach, uses pairs of training images that include a source image and a target image. In general, the network module 220 derives the warped depth map 260 using the source image, and the comparison for training occurs against the target image. However, in further aspects, the network module 220 may derive a depth map for both of the images depending on the way in which the depth system 170 implements the loss calculation.

At 620, the network module 220 encodes, using an encoder of a depth model 250, the source image. Encoding the source image includes encoding the source image into depth features of a scene depicted by the source image. That is, for example, the encoder 300 iteratively convolves the source image and intermediate outputs of the process to generate the depth features. The depth features themselves are encoded features of the source image representing objects depicted within the source image. Accordingly, the encoder 300 provides the depth features as intermediate outputs of processing the source image.

Additionally, in at least one approach, the network module 220 executes the pose model 270, at 620, to process the source image and the target image to generate a transformation of poses between the images. Although the pose model 270 may be used in various circumstances for generating transformations that have application beyond training, the depth system 170 generally uses the pose model 270 for training the depth model 250. Thus, when implemented as part of the depth system 170, the pose model 270 may reside in an idle state when the system 170 is not training the depth model 250. The pose model 270 functions to facilitate the self-supervised structure from motion (SfM) training regime by providing the transformation from which the network module 220 may derive further information (e.g., warped values) to help assess the performance of the depth model 250. Of course, as an additional aspect of using the pose model 270 to generate the transformations, the network module 220 also trains the pose model 270 and does so, in one embodiment, in combination with the depth model 250.

At 630, the network module 220 warps the depth features into warped features. The network module 220 warps the depth features by applying the transformation derived by the pose model 270. In one approach, applying the transformation includes spatially adapting the depth features using the transformation in order to translate the depth features into a target frame of the target image. That is, the network module 220 effectively adapts a perspective of the depth features as originally defined according to the source image so that the warped depth features are within a space of the target image. In this way, the depth system 170 avoids subsequently warping the depth values, which can include learned aspects imparted by the decoder 310, and that may introduce further aberrations when warping.

At 640, decoding, using a decoder of the depth model 250, the warped features into the depth map 260 that is also warped. In one arrangement, the network module 220 employs the decoder 310 to decode the warped features by generating the depth map 260 as a per-pixel representation of depth within the scene from a perspective of the target image. It is possible to generate the depth map 260 originally as an output of the decoder 310 having the perspective of the target image even though generated from the source image because of the intermediate warping of the depth features. This intermediate warping provides for adjusting the depth features prior to decoding and thereby avoids difficulties with warping explicit depth values, which may include learned features that are absent in the encoded depth features.

At 650, the network module 220 trains the depth model 250 according to a loss derived from the depth map. In one approach, the network module 220 uses the depth map 260 derived from the warped features to synthesize the target image. This synthetic image is essentially an inferred form of the target image that is derived from the inferred information in the depth map 260 from the depth model 250. Thus, the network module 220 can apply a loss function to the synthetic image and the target image to generate a photometric loss that embodies errors in the original depth map 260. Alternatively, the network module 220 may use a direct comparison between depth maps to derive a loss signal for training. For example, the network module 220 can compare the depth map 260 derived from the warped features with a depth generated from the source image without warped features since these depth maps would be within the same frame of reference.

In any case, with further reference to training in relation to a photometric loss using a synthetic image, the loss values are photometric losses, which are appearance-based and derive from a comparison of the synthetic image created from the depth map 260 with the target image. In one approach, the network module 220 synthesizes a synthetic target image $\hat{I}_t$ from the warped depth map 260. This synthesized target image $\hat{I}_t$ generally corresponds to the training target image $I_t$ as opposed to the source image $I_s$ to which the depth map 260 $\hat{D}_t$ corresponds. Thus, the network module 220 generates the synthetic target image $\hat{I}_t$ as a regenerated view of the same scene depicted by the target image $I_t$. In various approaches, the network module 220 may implement different algorithms to perform the synthesizing, which may include a convolutional neural network (CNN) or other machine learning architecture, such as a generative network. Whichever approach is undertaken, the pixel values of the synthetic image serve as a point of comparison in order to identify the accuracy of the depth model 250 in producing the depth map $\hat{D}_t$.

Training the depth model 250 may include minimizing error embodied by the loss values. Thus, the network module 220 uses this appearance-based loss to account for pixel-level similarities and irregularities between the synthesized image derived from depth predictions of the depth model 250 and the target image that is the original input into the depth model 250. In general, the network module 220 updates the depth model 250 according to the loss values as determined by the network module 220. In one embodiment, the network module 220 updates the depth model 250 using the loss values to adapt weights in the model 250. Therefore, the disclosed training approach implemented by the depth system 170 improves the understanding of the depth model 250 while using the self-supervised loss without any additional supervision for the depth model 250. In this way, the depth system 170 improves the depth model 250 to produce improved depth estimates that translate into improved situational awareness of the implementing device (e.g., the vehicle 100), and improved abilities to navigate and perform other functions therefrom. Moreover, by warping the depth features instead of the depth values, the depth system 170 avoids the noted difficulties to produce an improved version of the depth model 250.

At 660, the network module 220 provides the depth model 250. In one arrangement, the network module 220 provides the depth model 250 upon completion of training, which may occur after a defined number of iterations of the training process over a plurality of images in a set of training data or according to a desired residual loss value from subsequent iterations of training. The resulting depth model 250 can then be implemented in the vehicle 100 to improve perception for various tasks. It should be appreciated that the network module 220 can provide an electronic output indicating depth within a perceived scene. As one example, the network module 220, in one approach, uses the outputs to map locations of obstacles in the surrounding environment and plan a trajectory that safely navigates the obstacles. Thus, the network module 220 may, in one embodiment, control the vehicle 100 to navigate through the surrounding environment according to the outputs of the depth model 250.

In further aspects, the network module 220 conveys the electronic outputs to further internal systems/components of the vehicle 100, such as the automated driving module 160. By way of example, in one arrangement, the network module 220 generates the depth map using the model 250 and conveys the electronic outputs to the automated driving module 160. In this way, the depth system 170 informs the automated driving module 160 of depth estimates, objects, and so on to improve situational awareness and planning of the module 160. It should be appreciated that the automated driving module 160 is indicated as one example, and, in further arrangements, the network module 220 may provide the outputs to the module 160 and/or other components in parallel or as a separate communication.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124 (e.g., 4 beam LiDAR), one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes a device, or component, that enables information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the depth system 170, and/or the automated driving module 160 can be operatively connected to communicate with the various vehicle systems 140 and/or individual components thereof. For example, returning to FIG. 1, the processor(s) 110 and/or the automated driving module 160 can be in communication to send and/or receive information from the various vehicle systems 140 to control the movement, speed, maneuvering, heading, direction, etc. of the vehicle 100. The processor(s) 110, the depth system 170, and/or the automated driving module 160 may control some or all of these vehicle systems 140 and, thus, may be partially or fully autonomous.

The processor(s) 110, the depth system 170, and/or the automated driving module 160 can be operatively connected to communicate with the various vehicle systems 140 and/or individual components thereof. For example, returning to FIG. 1, the processor(s) 110, the depth system 170, and/or the automated driving module 160 can be in communication to send and/or receive information from the various vehicle systems 140 to control the movement, speed, maneuvering, heading, direction, etc. of the vehicle 100. The processor(s) 110, the depth system 170, and/or the automated driving module 160 may control some or all of these vehicle systems 140.

The processor(s) 110, the depth system 170, and/or the automated driving module 160 may be operable to control the navigation and/or maneuvering of the vehicle 100 by controlling one or more of the vehicle systems 140 and/or components thereof. For instance, when operating in an autonomous mode, the processor(s) 110, the depth system 170, and/or the automated driving module 160 can control the direction and/or speed of the vehicle 100. The processor(s) 110, the depth system 170, and/or the automated driving module 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the automated driving module 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The automated driving module 160 can be configured to receive data from the sensor system 120 and/or any other type of system capable of capturing information relating to the vehicle 100 and/or the external environment of the vehicle 100. In one or more arrangements, the automated driving module 160 can use such data to generate one or more driving scene models. The automated driving module 160 can determine a position and velocity of the vehicle 100. The automated driving module 160 can determine the location of obstacles, obstacles, or other environmental features including traffic signs, trees, shrubs, neighboring vehicles, pedestrians, etc.

The automated driving module 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module 160 either independently or in combination with the depth system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module 160 can be configured to implement determined driving maneuvers. The automated driving module 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A depth system, comprising:
one or more processors;
a memory communicably coupled to the one or more processors and storing instructions that, when executed by the one or more processors, cause the one or more processors to:
encode, using an encoder of a depth model, a source image into depth features of a scene depicted by the source image, the depth features being intermediate processing results of the depth model;
warp the depth features into warped features of a target frame of a target image associated with the source image, wherein the instructions include instructions to warp the depth features between the encoder and a decoder of the depth model, wherein the depth features are encoded state information of the source image embedded into different channels;
decode, using the decoder of the depth model, the warped features into a depth map; and
train the depth model according to a loss derived from the depth map.

2. The depth system of claim 1, wherein the instructions to warp the depth features include instructions to determine, using a pose model, a transformation between the source image and the target image, and instructions to apply the transformation to the depth features as an intermediate process of the depth model to generate the warped features.

3. The depth system of claim 1, wherein the instructions to train the depth model include instructions to synthesize a training image to approximate the target image using the depth map and to calculate at least a photometric loss between the training image and the target image.

4. The depth system of claim 1, wherein the instructions to train the depth model include instructions to train according to a self-supervised monocular structure-from-motion (sfm) process that uses a monocular video of a surrounding environment collected while a camera is in motion through the surrounding environment to generate a plurality of images including the source image and the target image.

5. The depth system of claim 1, wherein the depth features are encoded features of the source image representing objects depicted within the source image, and wherein the depth model is a machine learning algorithm that is an encoder-decoder-based architecture that includes at least convolutional layers.

6. The depth system of claim 1, wherein the instructions to decode the warped features include instructions to generate the depth map as a per-pixel representation of depth within the scene from a perspective of the target image.

7. The depth system of claim 1, wherein the target image and the source image depict the scene from different views.

8. The depth system of claim 1, wherein the target image and the source image are separate by a defined number of frames within a video.

9. A non-transitory computer-readable medium including instructions that, when executed by one or more processors, cause the one or more processors to:
encode, using an encoder of a depth model, a source image into depth features of a scene depicted by the source image, the depth features being intermediate processing results of the depth model;
warp the depth features into warped features of a target frame of a target image associated with the source image, wherein instructions include instructions to warp the depth features between the encoder and a decoder of the depth model, wherein the depth features are encoded state information of the source image embedded into different channels;
decode, using the decoder of the depth model, the warped features into a depth map; and
train the depth model according to a loss derived from the depth map.

10. The non-transitory computer-readable medium of claim 9, wherein the instructions to warp the depth features include instructions to determine, using a pose model, a transformation between the source image and the target image, and applying the transformation to the depth features as an intermediate process of the depth model to generate the warped features.

11. The non-transitory computer-readable medium of claim 9, wherein the instructions to train the depth model include instructions to synthesize a training image to approximate the target image using the depth map and to calculate at least a photometric loss between the training image and the target image.

12. The non-transitory computer-readable medium of claim 9, wherein the instructions to train the depth model include instructions to train according to a self-supervised monocular structure-from-motion (sfm) process that uses a monocular video of a surrounding environment collected while a camera is in motion through the surrounding environment to generate a plurality of images including the source image and the target image.

13. The non-transitory computer-readable medium of claim 9, wherein the depth features are encoded features of the source image representing objects depicted within the source image, and wherein the depth model is a machine learning algorithm that is an encoder-decoder-based architecture that includes at least convolutional layers.

14. A method, comprising:
encoding, using an encoder of a depth model, a source image into depth features of a scene depicted by the source image, the depth features being intermediate processing results of the depth model;
warping the depth features into warped features of a target frame of a target image associated with the source image, wherein the warping occurs between the encoder and a decoder of the depth model, wherein the depth features are encoded state information of the source image embedded into different channels;
decoding, using the decoder of the depth model, the warped features into a depth map; and
training the depth model according to a loss derived from the depth map.

15. The method of claim 14, wherein warping the depth features includes determining, using a pose model, a transformation between the source image and the target image, and applying the transformation to the depth features as an intermediate process of the depth model to generate the warped features.

16. The method of claim 14, wherein training the depth model includes synthesizing a training image to approximate the target image using the depth map and calculating at least a photometric loss between the training image and the target image.

17. The method of claim 14, wherein training the depth model includes training according to a self-supervised monocular structure-from-motion (sfm) process that uses a monocular video of a surrounding environment collected while a camera is in motion through the surrounding environment to generate a plurality of images including the source image and the target image.

18. The method of claim 14, wherein the depth features are encoded features of the source image representing objects depicted within the source image, and wherein the depth model is a machine learning algorithm that is an encoder-decoder-based architecture that includes at least 5 convolutional layers.

19. The method of claim 14, wherein decoding the warped features includes generating the depth map as a per-pixel representation of depth within the scene from a perspective of the target image.

20. The method of claim 14, wherein the target image and the source image depict the scene from different views.

* * * * *